Nov. 28, 1933.    V. C. KING    1,936,764
LINK CONVEYER BELT
Filed Oct. 31, 1931    2 Sheets-Sheet 1
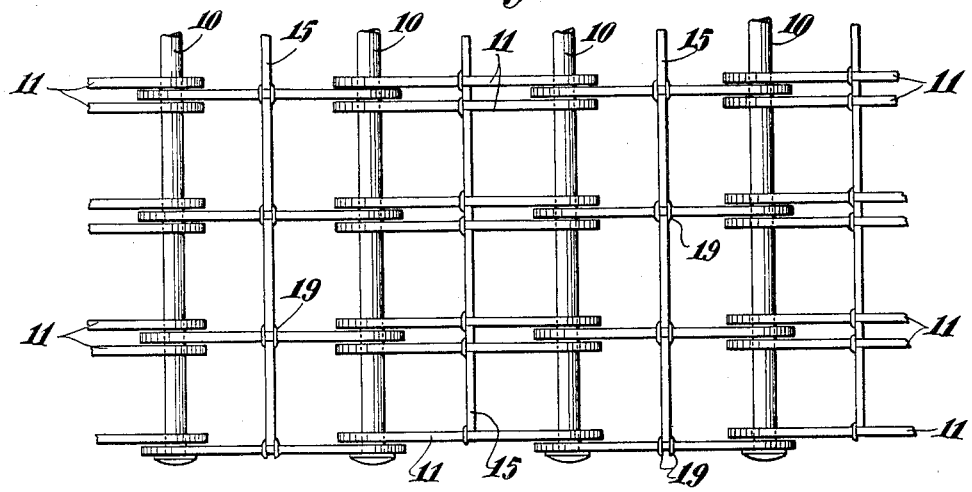
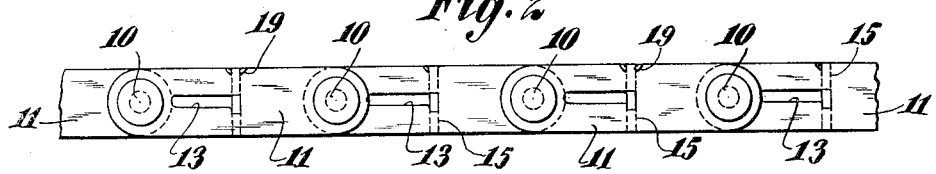
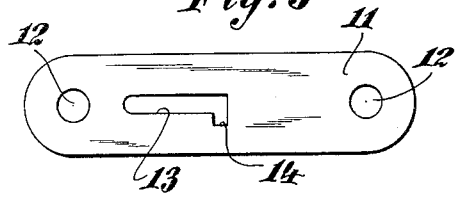 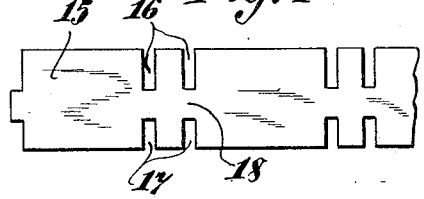
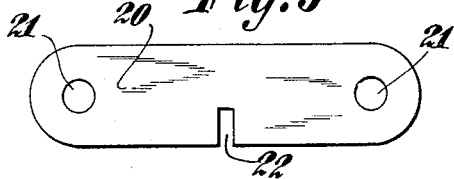 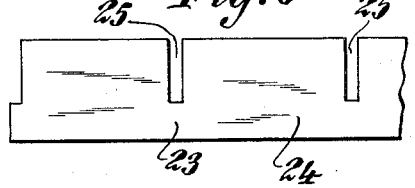
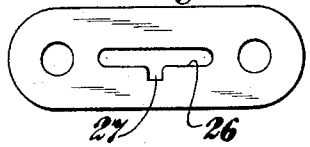
INVENTOR
Vernon C. King,
BY Redding, Greely, O'Shea & Campbell
HIS ATTORNEYS Nov. 28, 1933.  V. C. KING  1,936,764
LINK CONVEYER BELT
Filed Oct. 31, 1931  2 Sheets-Sheet 2

INVENTOR
Vernon C. King,
BY
Redding, Greeley, O'Shea & Campbell
HIS ATTORNEYS

Patented Nov. 28, 1933

1,936,764

UNITED STATES PATENT OFFICE 1,936,764

LINK CONVEYER BELT

Vernon C. King, Worcester, Mass., assignor to Edward C. Bowers and Charles L. Feldman receivers for Wickwire Spencer Steel Company, New York, N. Y., a corporation of Delaware Application October 31, 1931. Serial No. 572,251

10 Claims. (Cl. 198—193)

The present invention relates to conveyer belts and embodies, more specifically, an improved form of link conveyer belt including a plurality of flat links placed on edge and hinged together by a common pin. These links are properly spaced by means of a spacer bar and the present invention relates to an improved construction whereby the manufacture and assembly of these elements is greatly facilitated.

Considerable demand has arisen for link conveyer belts of the above character and an object of the present invention is to provide a link belt construction wherein the links are maintained in position by means of a continuous spacer bar which extends throughout the width of the belt, the construction of the links and bar being such as to facilitate the assembly of the belt.

A further object of the invention is to provide a construction of the above character wherein the spacer bar is adapted to be assembled in such fashion that it lies flush with the top and bottom of the belt to serve, additionally, as a lateral supporting member of the belt.

A further object of the invention is to provide a belt of the above character wherein the securing of the spacer bar to the cross links is effectively accomplished in a simple fashion, all of the links being effectively secured in position by the bar after assembly thereof.

A further object of the invention is to provide a belt of the above character wherein the openings between longitudinal supports are diminished in size, thus preventing small articles from falling between the links of the belt, as well as facilitating the sliding of goods laterally across the surface of the belt.

Further objects, not specifically enumerated above, will be apparent as the invention is described in greater detail in connection with the accompanying drawings, wherein:

Figure 1 is a plan view showing a belt constructed in accordance with the present invention and provided with links connected to the connecting pins with double sheer thereon.

Figure 2 is a view in side elevation showing the belt of Figure 1.

Figure 3 is a detail view showing a link utilized in the belt construction shown in Figures 1 and 2.

Figure 4 is a view in side elevation showing the spacer bars of Figure 1.

Figure 5 is a view similar to Figure 3 showing a modified form of link.

Figure 6 is a view similar to Figure 4 showing a modified form of spacer bar for use in connection with the link shown in Figure 5.

Figure 7 shows a modified form of link for use in connection with a belt constructed in accordance with the present invention wherein the links are short.

Figure 8:
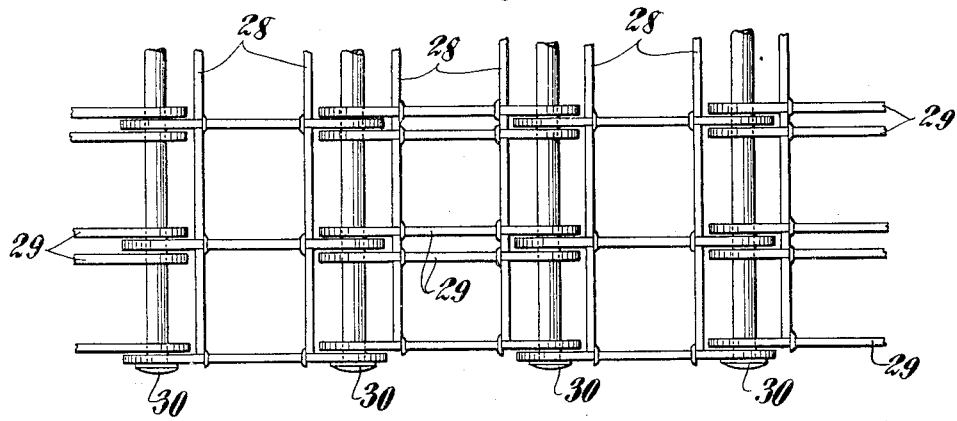
Figure 8 is a plan view of a modified form of a link belt constructed in accordance with the present invention and utilizing double spacer bars in connection with links in double sheer.

With reference to the construction shown in Figures 1, 2, 3, and 4, transverse connecting pins are shown at 10 to which links 11 are pivoted. These links are formed as shown in Figure 3 with end apertures 12 to receive the connecting pins 10 and with an elongated intermediate aperture 13 having an offset notch 14. Spacer bars 15 are formed of sufficient width to be inserted through the notches 13, the bars being turned through 90° after the respective links 11 have been correctly spaced transversely of the belt with respect to the bars 15. Pairs of recesses 16 and 17 are provided in the bar 15, these recesses being adapted to receive the respective links 11 and space them properly, as above described. When the links 11 are properly spaced, therefor, the recesses or notches 16 permit the spacer bar 15 to be turned through 90°, during which turning movement the portions 18 of the bar 15 engage the offset notch 14 of the respective links and the elements are adapted to be secured permanently in such position. The spacer bar may either be welded at 19 to the respective links or the links may be peened or upset to lock the bars in position.

When each spacer bar has been secured to its respective links, the unit so formed, constituting a link of the belt, may be secured to the connecting pins 10 in proper relation to adjacent units and the belt thus assembled. To provide the construction shown in Figure 1, the spacer bars are alternately designed to receive spaced single links and spaced pairs of links, the single links being adapted to be received between the respective links of the respective pairs, thus affording a link construction of the double sheer type.

In the construction shown in Figures 5 and 6, a modified locking construction is embodied, links 20 being formed with apertures 21 to receive connecting pins 10 as described in connection with the links shown in Figure 3 and the links are further notched at 22 to receive the cooperating portion 23 of a spacer bar 24. The spacer bars 24 are formed with spaced notches 25 to receive the portions of the links 20 lying between the notches 22 and the opposite sides of the links. When the links and bars are assembled, the upper edges of the links are flush with the upper edges of the bars, thus affording a belt having a uniform surface, as in the construction described in connection with Figures 1, 2, 3, and 4.

The links may be locked to the bars by welding at the intersections, or by peening over the edges of the spacer bar to form notches to cooperate with the similarly formed portions on the links.

In the construction shown in Figure 7, a link is provided for belts of the short link type wherein the spacer bar is in the center of the links. In this form of link, the slot 26 is formed with an intermediate notch 27 which receives the spacer bar and permits the same to be secured in its proper position in the median plane of the links.

Figure 9:
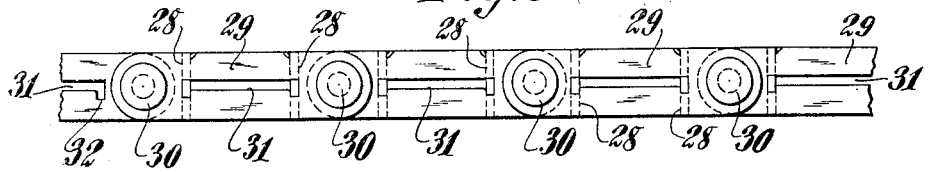
Figure 9 is a view in side elevation showing the belt of Figure 8.
Figure 10:
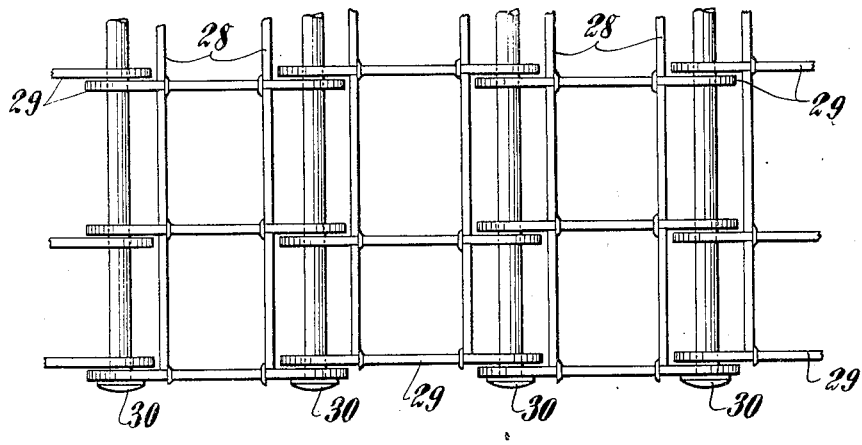
Figure 10 is a plan view showing a modified form of link belt wherein links are connected in single sheer to the connecting pins, double spacer bars being utilized.
Figure 11:
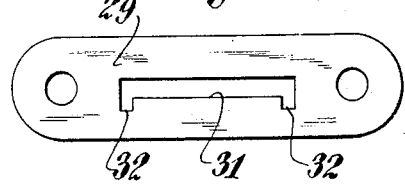
Figure 11 is a detail view in side elevation showing a link used in the belt constructions shown in Figures 8, 9, and 10.

In the construction shown in Figures 8, 9, 10, and 11, double spacer bars are utilized between each connecting pin, the bars being shown at 28 and assembled in links 29 which are hinged on the connecting pins 30. The links 29 are formed with intermediate slots 31 having offset notches 32 at each end thereof. The belt is assembled by inserting the bars 28 into the recesses 31, turning the same and secure them in their respective positions at either end of the slots 31, as shown in Figures 8, 9, and 10. The construction shown in Figures 8 and 9 includes a double spacer bar construction with links in double sheer, the link assembly being similar to that described in Figures 1, 2, 3, and 4 while in the form shown in Figure 10, links are provided in single sheer, the spacer bars for securing the same being of uniform character.

From the foregoing, it will be seen that a link conveyer belt has been provided which may be manufactured from a plurality of standardized parts, the number of which parts is comparatively few. The assembly of the links, connecting pins, and spacer bars involves but a simple operation and, in operation, no part of the belt projects above the plane thereof at any time. All of the upper edges of the longitudinal links and lateral or transverse spacer bars lie in a common plane and thus afford a good conveying surface.

While the invention has been described with specific reference to the accompanying drawings, it is not to be limited, save as defined in the appended claims.

I claim as my invention:

1. A conveyer belt unit comprising a plurality of longitudinal links, transverse spacer bars extending across the belt, each being secured rigidly to a plurality of the links and lying flush therewith, and connecting pins between certain of the links.

2. A conveyer belt unit comprising a plurality of longitudinal links formed with elongated apertures, spacer bars adapted to be inserted in the apertures, and means for securing the bars to the links to lie flush therewith.

3. A conveyer belt unit comprising a plurality of longitudinal links formed with elongated apertures having offset notches, spacer bars adapted to be inserted in the apertures and having recesses to receive the links, said bars normally lying in the notches, and means for securing the bars to the links to lie flush therewith.

4. A conveyer belt unit comprising a plurality of longitudinal links, said links being formed with longitudinal apertures having offset notches in a plane at right angles to the axis of the links, and spacer bars inserted in the apertures and secured flush with the links in the offset notches, said bars being formed with recesses to receive the links.

5. A conveyer belt unit comprising a plurality of longitudinal links, said links being formed with longitudinal apertures having offset notches at each end thereof in a plane at right angles to the axis of the links, and spacer bars inserted in the apertures and secured flush with the links in the offset notches, said bars being formed with recesses to receive the links.

6. A conveyer belt unit comprising a plurality of longitudinal links, spacer bars connected o the links and lying flush therewith, and connecting pins between certain of the links, and interengaging notches in the links and bars.

7. A conveyer belt unit comprising a plurality of longitudinal links, said links being formed with longitudinal apertures having offset notches intermediate the ends thereof in a plane at right angles to the axis of the links, and spacer bars inserted in the apertures and secured flush with the links in the offset notches, said bars being formed with recesses to receive the links.

8. As an article of manufacture, a link for a conveyer belt having apertured ends and an elongated aperture intermediate the ends of the link, and having a notch at one end thereof.

9. As an article of manufacture, a link for a conveyer belt having apertured ends, and an elongated notched aperture intermediate the ends of the link.

10. A conveyer belt comprising a plurality of series of three or more transversely spaced longitudinal links, the end of a series being hingedly connected to the adjacent ends of the links of adjacent series by transverse hinge pins, and transverse spacer bars extending across the belt between the hinge pins and secured rigidly to all of the links of the respective series.

VERNON C. KING.